UNITED STATES PATENT OFFICE.

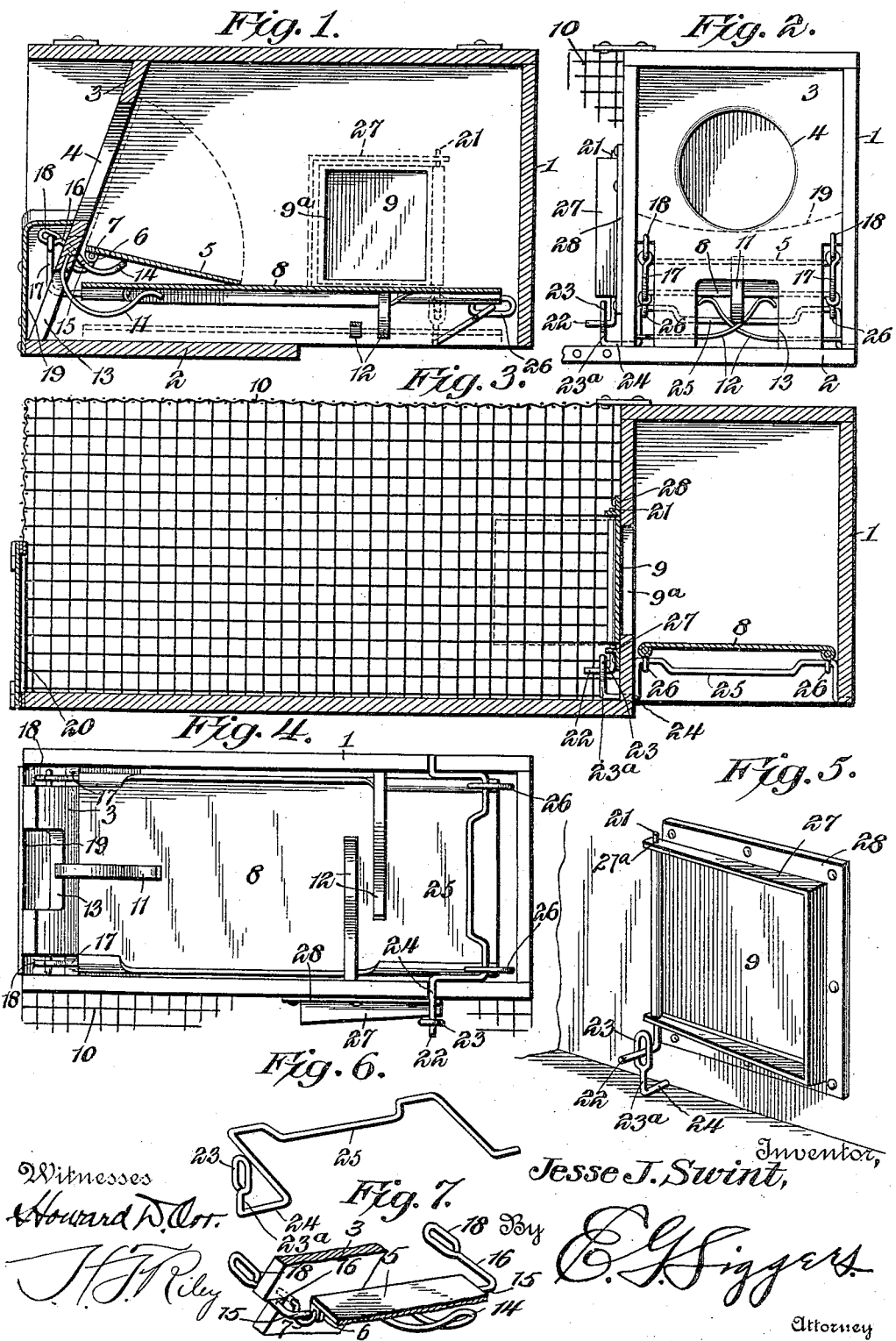

JESSE J. SWINT, OF LANGDALE, ALABAMA.

ANIMAL-TRAP.

No. 816,398.  Specification of Letters Patent.  Patented March 27, 1906.

Application filed June 12, 1905. Serial No. 264,832.

*To all whom it may concern:*

Be it known that I, JESSE J. SWINT, a citizen of the United States, residing at Langdale, in the county of Chambers and State of Alabama, have invented a new and useful Animal-Trap, of which the following is a specification.

The invention relates to improvements in animal-traps.

The object of the present invention is to improve the construction of animal-traps and to provide a simple and comparatively inexpensive one designed for catching mice, rats, and other small animals and adapted to be sprung by the weight of an animal and automatically reset, whereby it is adapted for successfully catching a large number of animals without requiring any attention.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a longitudinal sectional view of a trap constructed in accordance with this invention. Fig. 2 is a front elevation, the cage being broken away. Fig. 3 is a transverse sectional view. Fig. 4 is a reverse plan view. Fig. 5 is a detail perspective view of the horizontally-swinging door. Fig. 6 is a detail view of the rear rock-shaft. Fig. 7 is a detail view of the front rock-shaft.

Like numerals of reference designate corresponding parts in all the figures of the drawings.

1 designates a casing designed to be constructed of any suitable material and composed of top, side, and end walls. The casing is provided with a bottom section 2, a portion of the bottom being open to permit the casing to be placed over a suitable bait, as hereinafter explained. The front wall 3 is inclined and is provided with an entrance-opening 4 for the passage of the animals. Hinged to the inner face of the front wall is a door 5, which, as hereinafter explained, is automatically closed when an animal enters the trap, whereby the animal is prevented from escaping through the entrance-opening 4. The door 5 is provided at its hinged edge with ears 6 for the reception of pintles 7, which are mounted on the inner face of the front wall 3 at opposite sides thereof. The door 5 is normally open, and its free edge rests upon a platform 8, which is adapted to be depressed by the weight of an animal for actuating the door 5 to close the same and for opening a door 9 to permit the animal to pass into a cage 10. The platform 8 is preferably constructed of sheet metal, and it is yieldably supported by means of front and rear curved springs 11 and 12. The spring 11, which is disposed longitudinally of the casing, is secured at its front end to the front wall at an opening or cut-away portion 13, and it extends rearwardly to a point beneath the front of the platform and supports the same. The springs 12, which are disposed transversely of the casing, are located at the rear portion of the platform, being secured at their outer ends to the side walls of the casing and having their rear ends located beneath and supporting the rear portion of the platform. The springs permit the platform to be depressed by the weight of an animal, and motion is communicated from the platform to the doors 5 and 9 for reversely opening and closing the same. When the platform 8 is depressed, the front door 5 is engaged by a central loop or bend 14 of a rock-shaft 15, which is mounted in bearings formed by the said pintles 7 and which has forwardly-extending terminal arms 16. The pintles 7 have L-shaped supporting portions which extend rearwardly and upwardly from the inner face of the front wall of the casing, and bearings are thereby provided for the end portions of the front rock-shaft, which is disposed transversely of the casing. The front end of the platform is provided with a pair of substantially L-shaped arms 17, terminating in eyes which are linked into elongated eyes or loops 18 of the arms 16 of the front rock-shaft. The platform in its downward movement carries with it the forwardly-extending terminal arms of the front rock-shaft 15, and the central loop 14, which is curved, as shown, swings upwardly and closes the door 5. The casing is provided at the lower portion of the front wall with a shield 19, constructed of sheet metal or other suitable material, for protecting and concealing the front rock-shaft and the arms of the platform. The front door when opened rests upon the platform, and the weight of the animal upon the door 5 will prevent the same from closing until the animal is entirely within the trap and beyond the front door. The wall adjacent to the cage is provided with a door-opening 9ª, and the horizontally-swinging door is mounted on the exterior of the casing 1 and swings into the cage 10. The cage may be of any desired construction, the top end walls being preferably constructed of wire and a suitable door 20 being provided for emptying the cage. The cage may be permanently secured to the casing 1, or it may be attached to the same in any other desired manner. The horizontally-swinging door is mounted on a vertical pintle-rod 21, which is arranged in suitable eyes 21ª and which is provided at its lower end with a horizontally-swinging arm 22. The arm 22 extends through a loop 23 of an end arm 23ª of a rear rock-shaft 24, journaled in suitable bearings of the opposite side walls of the cage and provided with a central loop 25, forming an intermediate arm to be engaged by the rear portion of the depressible platform. The platform is provided with elongated loops or eyes 26, constructed of wire or any other suitable material and receiving the intermediate loop or arm of the rear rock-shaft, whereby when the platform is depressed by the weight of an animal the intermediate arm or loop will be swung downward. This movement of the rock-shaft causes the end arm 23ª to oscillate and open the rear side door 9. The captured animal, finding the front or outer door closed and the rear or inner door open, will in attempting to escape pass through the door-opening and enter the cage. As soon as the platform is relieved of the weight of the animal the springs will move it upward and cause it to close the side door and open the front door. The platform swings the central arm of the rear rock-shaft upward and positively closes the rear or inner door, which is arranged within a substantially U-shaped guard 27, consisting of projecting flanges located at the free edge of the door 9 and also at the upper and lower edges thereof to prevent an animal from opening the door and returning into the casing. The flanges extend outward from an attachment-plate 28, which is secured to the exterior of the casing. As a portion of the bottom of the casing is opened a bait may be readily placed beneath the platform. The animals smelling the bait will be attracted and caused to enter the casing, but will be unable to obtain access to the bait, so that the trap will not require rebaiting after each operation.

It will be seen that as the front wall is inclined the front or outer door when closed will be arranged at an inclination and will open automatically by gravity as soon as it is free to move. Also it will be clear that the front or outer door is positively closed when the platform is subjected to the weight of an animal, so that an animal entering the casing will be effectually prevented from escaping.

Having thus fully described my invention, what I claim as new, and desire to secure by Letters Patent, is—

1. In a trap, the combination of a casing having an entrance-opening, a depressible platform arranged within the casing, a normally open door located at the entrance-opening, and a rock-shaft mounted on the casing independently of the door and the platform and provided with arms connected respectively with the platform and with the door for closing the latter when the platform is depressed.

2. In a trap, the combination of a casing having an entrance-opening, a depressible platform mounted within the casing and provided with projecting arms, a normally open door located at the entrance-opening of the casing, and a rock-shaft mounted on the casing independently of the platform and the door and provided with terminal arms connected with the arms of the platform, said rock-shaft being also provided with an intermediate arm arranged to engage and close the door when the platform is depressed.

3. In a trap, the combination of a casing having an entrance-opening and provided with an outlet adapted to communicate with a cage, inner and outer reversely-operating doors, a depressible platform located within the casing, and rock-shafts mounted on the casing independently of the doors and the platform and connected with and actuated by the platform for operating the said doors.

4. In a trap, the combination of a casing having an entrance-opening and provided with an outlet, inner and outer doors located at the outlet and at the entrance-opening, the inner door being arranged to swing horizontally, and means for communicating motion from the platform to both the inner and outer doors, whereby the latter will be reversely operated.

5. In a trap, the combination of a casing having an entrance-opening, a normally open door located at the entrance-opening, a depressible platform, springs secured to the casing and located at the front and rear portions of the platform and having free ends supporting the same.

6. In a trap, the combination of a casing having an opening, a horizontally-swinging door mounted at the opening and provided with an arm, a depressible platform, and a rock-shaft having a loop connected with the platform, said rock-shaft being also provided with an arm connected with and arranged to oscillate the arm of the door for opening and closing the same.

7. In a trap, the combination of a casing having an opening, a door hinged at the opening, a guard having flanges receiving the free edges of the door and projecting outward from the casing for preventing a captured animal from opening the door, and means for operating the door.

In testimony that I claim the foregoing as my own I have hereto affixed my signature in the presence of two witnesses.

JESSE J. SWINT.

Witnesses:
J. T. WOODALL,
K. H. GAINES.